US011284481B2

(12) United States Patent
Henson et al.

(10) Patent No.: US 11,284,481 B2
(45) Date of Patent: Mar. 22, 2022

(54) SMART SUSCEPTORS

(71) Applicant: The Boeing Company, Chicago, IL (US)

(72) Inventors: Landon K. Henson, Snoqualmie, WA (US); Marc R. Matsen, Seattle, WA (US); John R. Hull, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 302 days.

(21) Appl. No.: 16/051,434

(22) Filed: Jul. 31, 2018

(65) Prior Publication Data

US 2019/0239293 A1 Aug. 1, 2019

Related U.S. Application Data

(63) Continuation-in-part of application No. 15/884,976, filed on Jan. 31, 2018.

(51) Int. Cl.
| H05B 6/10 | (2006.01) |
| H05B 6/22 | (2006.01) |
| H05B 6/64 | (2006.01) |
| B32B 15/01 | (2006.01) |

(52) U.S. Cl.
CPC ............ *H05B 6/105* (2013.01); *B32B 15/01* (2013.01); *B32B 15/013* (2013.01); *B32B 15/015* (2013.01); *H05B 6/108* (2013.01); *H05B 2206/023* (2013.01)

(58) Field of Classification Search
CPC ..... B32B 15/015; B32B 15/013; B32B 15/01; H05B 6/108; H05B 6/105; H05B 2206/023

USPC ....... 219/634, 615, 633, 645, 602, 603, 607, 219/609, 617, 759, 635, 647, 659; 428/213, 329; 118/719, 728, 712
See application file for complete search history.

(56) References Cited

U.S. PATENT DOCUMENTS

| 4,224,494 A * | 9/1980 | Reboux ................. A47J 27/002 219/615 |
| 5,808,281 A | 9/1998 | Matsen et al. |
| 5,829,716 A * | 11/1998 | Kirkwood ......... B29C 66/81457 244/117 R |
| 6,566,635 B1 | 5/2003 | Matsen et al. |
| 6,770,144 B2 * | 8/2004 | Raffin ................. C23C 16/4405 118/719 |
| 6,897,419 B1 | 5/2005 | Brown et al. |
| 8,017,059 B2 | 9/2011 | Matsen et al. |
| 9,314,975 B1 | 4/2016 | Matsen et al. |
| 2005/0035115 A1 | 2/2005 | Anderson et al. |
| 2016/0143092 A1 | 5/2016 | Miller et al. |

OTHER PUBLICATIONS

European Search Repod Issued in Corresponding European Patent Application No. 18212040.2-1103 dated May 29, 2019, pp. 1-14.
Matsen, U.S. Appl. No. 15/791,683, filed Oct. 24, 2017 entitled "Induction Molding for Parts Having Thermoplastic Portions."

\* cited by examiner

*Primary Examiner* — Quang T Van
(74) *Attorney, Agent, or Firm* — MH2 Technology Law Group LLP

(57) ABSTRACT

A smart susceptor assembly, including a smart susceptor, and a cladding disposed on at least a portion of the smart susceptor, wherein the cladding includes an electrically conductive material.

20 Claims, 10 Drawing Sheets

SMART SUSCEPTORS

CROSS-REFERENCE TO RELATED APPLICATIONS

This application is a continuation-in-part of U.S. patent application Ser. No. 15/884,976 filed on Jan. 31, 2018. The disclosure of which is hereby incorporated by reference in its entirety.

TECHNICAL FIELD

The present teachings relate to the field of thermal control of materials and, more particularly, to heating of materials using a smart susceptor and adjusting the leveling temperature of smart susceptors.

BACKGROUND

A susceptor is a material that converts electromagnetic energy to thermal energy and may be used to heat various materials during, for example, a manufacturing process. A smart susceptor is a susceptor assembly that is self-regulating with regard to temperature. Typically, the smart susceptor is placed in an electromagnetic flux field that is generated by an inductor. Susceptor materials include various ferromagnetic materials, for example ferrous nickel-cobalt alloys such as Kovar®, as well as other alloys of iron, nickel, and cobalt.

At relatively low temperatures, the susceptor is highly permeable to the electromagnetic flux field and a cross sectional region through which electrons flow through the susceptor (i.e., the skin depth) is small. Thus, at these relatively low temperatures, an electrical resistance of the susceptor is high. When placed into the electromagnetic flux field generated, for example, by an induction coil that is part of the smart susceptor assembly, the susceptor begins to inductively heat due to the initially small skin depth and high magnetic permeability. As the susceptor heats, a thermal profile of the susceptor asymptotically approaches its leveling temperature where the susceptor maintains thermal equilibrium. The leveling temperature is typically a few degrees (e.g., within 2° F., or within 10° F., or within 50° F., or within 100° F.) below the smart susceptor's designed "Curie" temperature or "Tc", at which the susceptor becomes nonmagnetic. As the susceptor approaches its leveling temperature, the magnetic permeability of the susceptor decreases, which increases the skin depth, thereby attenuating the electrical resistance of the susceptor and reducing the heating effect. The drop in magnetic permeability limits the generation of heat at those susceptor portions at or near the leveling temperature. The magnetic flux of the susceptor shifts to the lower temperature portions having a higher magnetic permeability, thereby causing those portions of the susceptor that are below the leveling temperature to heat more quickly toward the leveling temperature. The magnetic permeability at a given point in time can be different for different regions of the susceptor, depending on the localized temperature at localized regions. As each localized region of the susceptor approaches the leveling temperature, the localized region becomes increasingly nonmagnetic until steady state (i.e., thermal equilibrium) is reached and further heating of the susceptor at the localized region ceases. Regions of the susceptor that reach the Curie temperature become nonmagnetic at or above the Curie temperature. When the susceptor begins to cool, its magnetic permeability increases, the skin depth decreases, its electrical resistance increases, and the heating process begins again.

Because of its properties of temperature self-regulation, the smart susceptor is a valuable tool in manufacturing and other uses.

BRIEF SUMMARY

This summary is intended merely to introduce a simplified summary of some aspects of one or more implementations of the present disclosure. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities embodied in the present disclosure may be achieved by providing a smart susceptor assembly, including a smart susceptor, and a cladding disposed on at least a portion of the smart susceptor, wherein the smart susceptor includes one or more of an iron alloy, a nickel alloy, a cobalt alloy, a ferrous nickel-cobalt alloy, and amorphous, a crystalline magnetic alloy, and combinations thereof, and wherein the cladding includes an electrically conductive material.

In another embodiment, the cladding physically contacts the smart susceptor, and the cladding has a thickness of about 0.53 millimeters (mm) to about 9.525 mm.

In another embodiment, the cladding includes one or more of copper, silver, gold, platinum, bronze, non-magnetic copper-nickel alloys, and combinations thereof.

In another embodiment, the cladding has at least one of a lower magnetic permeability than the smart susceptor, a higher thermal conductivity than the smart susceptor, and a higher electrical conductivity than the smart susceptor.

In another embodiment, the leveling temperature of the smart susceptor is higher in the cladded portions.

In another embodiment, the cladded smart susceptor has a higher leveling temperature when compared to a same but uncladded smart susceptor.

In another embodiment, a leveling temperature of the cladded smart susceptor is higher than a Curie temperature for the smart susceptor.

In another embodiment, a leveling temperature of the cladded smart susceptor is at least 5° F. higher when compared to a leveling temperature of a same but uncladded smart susceptor.

In another embodiment, the smart susceptor has a first leveling temperature corresponding to an uncladded portion of the smart susceptor, and a second leveling temperature corresponding to a cladded portion of the smart susceptor, the first leveling temperature being different from the second leveling temperature.

In another embodiment, the second leveling temperature is higher than the first leveling temperature.

In another embodiment, the second leveling temperature is higher than a Curie temperature of the smart susceptor.

In another embodiment, the second leveling temperature is at least 5° F. higher, at least 10° F. higher, at least 15° F. higher, at least 20° F. higher, at least 25° F. higher, or at least 30° F. higher than the first leveling temperature.

In another embodiment, the cladding comprises a first cladding portion and a second cladding portion, and wherein a leveling temperature of the smart susceptor corresponding to the first cladding portion is different from a leveling temperature of the smart susceptor corresponding to the second cladding portion.

In another embodiment, the first cladding portion has at least one of a different magnetic permeability than the second cladding portion, a different thermal conductivity than the second cladding portion, a different electrical conductivity than the second cladding portion, and combinations thereof.

In another embodiment, the leveling temperature of the smart susceptor corresponding to the first cladding portion is at least 5° F. higher, at least 10° F. higher, at least 15° F. higher, at least 20° F. higher, at least 25° F. higher, or at least 30° F. higher than the leveling temperature of the smart susceptor corresponding to the second cladding portion.

In another embodiment, the cladding includes a first cladding portion and a second cladding portion, the first cladding portion includes a first cladding material and the second cladding portion includes a second cladding material, and the first cladding material is different from the second cladding material.

In another embodiment, the cladding includes a first cladding portion and a second cladding portion, the first cladding portion having a first cladding thickness and the second cladding portion having a second cladding thickness, and the first cladding thickness is different from the second cladding thickness.

In another embodiment, a leveling temperature of an uncladded portion of the smart susceptor is different from at least one of the leveling temperature of the smart susceptor corresponding to the first cladding portion and the leveling temperature of the smart susceptor corresponding to the second cladding portion.

The foregoing and/or other aspects and utilities embodied in the present disclosure may be achieved by providing a smart susceptor assembly, including a smart susceptor, and an electrically conductive cladding covering at least a portion of the smart susceptor, wherein the cladding has at least one of a lower magnetic permeability, a higher thermal conductivity, and a higher electrical conductivity than the smart susceptor.

The foregoing and/or other aspects and utilities embodied in the present disclosure may be achieved by providing a method for adjusting a leveling temperature of a smart susceptor, including cladding at least a portion of a smart susceptor with an electrically conductive material; and adjusting the cladding to adjust a leveling temperature of the smart susceptor, wherein adjusting the cladding includes at least one of adjusting a thickness of the cladding to adjust the leveling temperature of the smart susceptor, adjusting a thickness of a portion of the cladding to adjust the leveling temperature of a corresponding portion of the smart susceptor, adjusting a composition of the cladding to adjust the leveling temperature of the smart susceptor, and adjusting a composition of a portion of the cladding to adjust the leveling temperature of a corresponding portion of the smart susceptor.

Further areas of applicability will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Generally, the same reference numbers will be used throughout the drawings to refer to the same or like parts.

As discussed above, smart susceptors are a useful tool in manufacturing and other uses due, in part, to their ability for thermal self-regulation. In flat (i.e., planar or blanket) configurations, the smart susceptor can maintain a generally uniform temperature across the entirety of the susceptor, for example, within 20°, or within 10° F. of the leveling temperature for which it is designed. The smart susceptor can be designed to approach a predetermined leveling temperature by, for example, selecting the percentage of one or more component materials of the susceptor, such as the percentage of one or more metal or metal alloy components. The leveling temperature is also dependent to a lesser extent on magnetic field strength and other factors.

Smart susceptors can be employed in many different uses and configurations. In some uses, the susceptor can be formed to encase or sheathe a solid structure that is to be heated to a specific temperature, for example, during a drying or curing process. In other uses, the susceptor can be formed or contoured to provide a receptacle. The receptacle may be used, for example, to store and heat a material such as a thermoset, thermoplastic, or mold material, or configured for other uses. For example, U.S. patent application Ser. No. 15/791,683 titled "Induction Molding for Parts Having Thermoplastic Portions," Filed Oct. 24, 2017, discusses a molding structure and process including a smart susceptor. As these materials are typically heated to a critical processing temperature or other target temperature for use, and overheating above the target temperature is avoided, the smart susceptor lends itself particularly well to such processes as the smart susceptor is self-regulating with regard to temperature.

Figure 1:
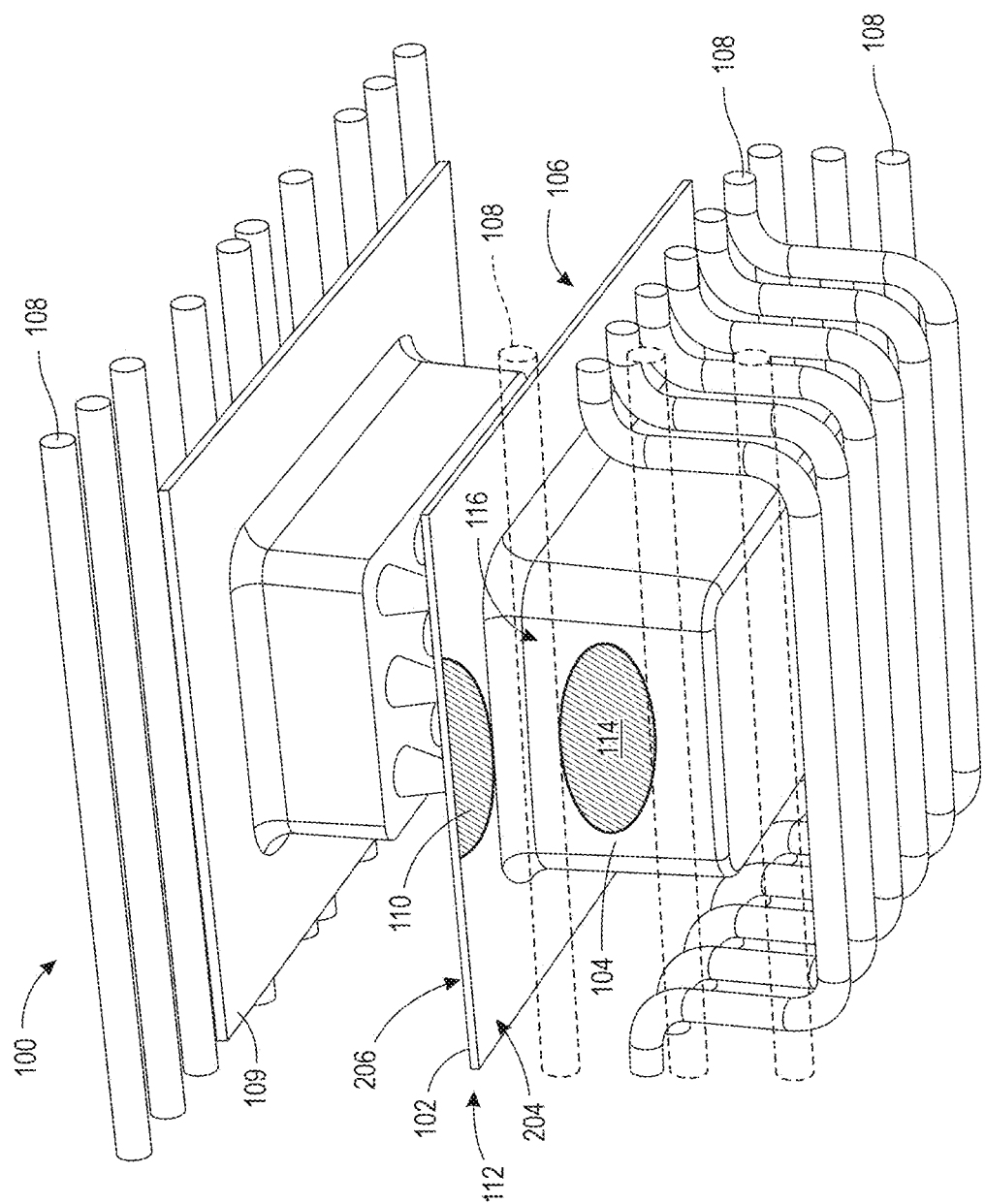
FIG. 1 is a partially exploded depiction of various smart susceptor assembly structures that can be used in an implementation of the present teachings.

Forming a susceptor to have a geometrically complex shape with one or more contours has been found to alter the thermal performance of the susceptor compared to the performance of a flat, planar, or blanket configuration. In some cases, thermal runaway and overheating at one or more locations of the contoured susceptor can occur. FIG. 1 is an exploded perspective depiction of a smart susceptor (i.e., a smart susceptor assembly) 100 that can be used during a process according to an implementation of the present teachings. While the present teachings are discussed with regard to a molding process, it will be appreciated that other uses that include a heating stage are contemplated. As such, while FIG. 1 depicts an overview of one possible smart susceptor assembly 100 design for a molding process, it will be appreciated that other designs for other uses may include other features that are not depicted, while various depicted features may be removed or modified.

The smart susceptor assembly 100 of FIG. 1 includes a susceptor 102 that provides a receptacle 104 for both storing and heating a flowable material 106 within the receptacle 104, such as a thermoset or other mold materials, and an electromagnetic flux field source such as one or more induction coils 108. The susceptor 102 can include one or more of an iron alloy, a nickel alloy, a cobalt alloy, and a ferrous nickel-cobalt alloy, or another suitable material. The smart susceptor assembly 100 further includes a mold 109 configured to mold the flowable material 106 during the molding process. In this implementation, the susceptor 102 is positioned adjacent to the induction coils 108 and, as depicted, the induction coils 108 are adjacent to all six sides of the susceptor 102 to provide inductive heating on six sides of the susceptor 102 in an attempt to ensure even heating of the flowable material 106 within the receptacle 104. Some portions of the induction coils 108 are depicted in phantom in FIGS. 1 and 2 to better show the susceptor 102. Without limiting the present disclosure, and purposes of explanation only, the susceptor 102 may be designed to have a leveling temperature of 788° F. to sufficiently heat the flowable material 106 to a target processing temperature although, in other implementations, the susceptor 102 may be designed to have another Tc.

During numerical simulation of a structure similar to that depicted in FIG. 1, it was found that the induction coils 108 induced various preferred current paths through the geometrically complex-shaped susceptor 102. The current flowing through the susceptor 102 tended to travel through these preferred current paths, which resulted in overheating of the susceptor 102 at and/or near the location of the preferred current paths. In particular, as depicted in FIG. 1, regions 110 such as lateral edges 112 of the susceptor 102 heated above the 788° F. Tc for which the susceptor 102 designed, heating to a temperature of more than 1400° F. Other regions 114 such as lateral ends 116 of the receptacle 104, reached thermal equilibrium well below the 788° F. leveling temperature, approaching only about 765° F. Generally, regions 110 that tend to reach thermal equilibrium at a temperature above the leveling temperature are referred to herein as "overheated regions 110" while regions 114 that that tend to reach thermal equilibrium at a temperature that is less than about 10° F. below the leveling temperature are referred to herein as "underheated regions 114."

Figure 2:
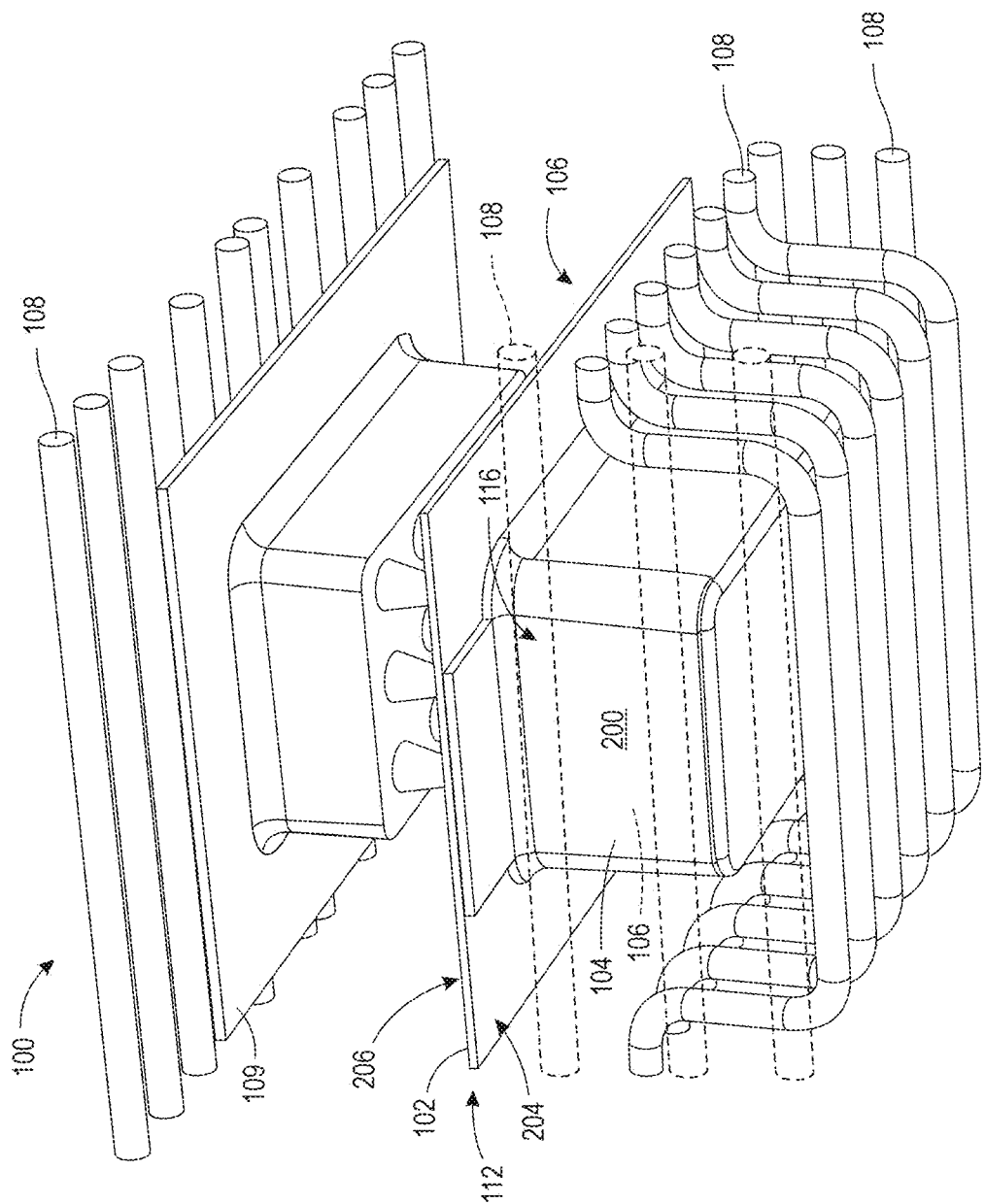
FIG. 2 depicts the FIG. 1 structure and further includes a cladding layer in accordance with an implementation of the present teachings.

In one implementation of the present teachings, to mitigate the preferred current paths through the susceptor and their adverse effects, a localized electrically conductive skin or cladding 200 is provided on or over the susceptor 102 as depicted in the partially exploded perspective depiction of FIG. 2. The cladding 200 is provided on a surface of the susceptor 102 adjacent to the overheated regions 110, and extending from the overheated regions 110 to the underheated regions 114. The cladding 200 alters the electrical performance of the smart susceptor 100, thereby improving the thermal performance of the smart susceptor 100. The cladding 200 also functions as a passive heat exchanger, although the effect of the cladding 200 as a passive heat exchanger affects the thermal performance of the smart susceptor 100 to a lesser extent than its electrical effect. While the cladding 200 is depicted herein as a single layer, it will be appreciated that the cladding 200 may include two or more layers of the same or different materials.

The cladding 200 can be an electrically conductive material such as copper, silver, gold, platinum, bronze, and non-magnetic copper-nickel. In general, the cladding 200 may be or include a layer of a material that has a lower magnetic permeability than the material from which the susceptor is formed, a high thermal conductivity, and a high electrical conductivity. At an applied magnetic field of about 5 oersted (Oe) to about 350 Oe and a temperature of 75° F., Kovar has a magnetic permeability of about 50 Newtons per amp squared ($N/A^2$) to about 500 $N/A^2$, depending on the magnitude of the applied magnetic field. Generally, at 75° F. and the applied magnetic field of about 5 Oe to about 350 Oe, suitable susceptors will have a magnetic permeability of about 50 $N/A^2$ to about 800 $N/A^2$. At an applied magnetic field of about 5 Oe to about 350 Oe and at the leveling temperature, for example 788° F., susceptors can have a magnetic permeability of about 1 $N/A^2$ to about 1.5 $N/A^2$. Being non-magnetic, copper cladding 200 has a magnetic permeability of 1 at all working temperatures, and the cladding 200 will generally have a magnetic permeability of about 1 to about 5 at all working temperatures, depending on the material. Kovar can have a thermal conductivity of 17 Watts/meter-Kelvin (W/mK). The cladding 200 can have a thermal conductivity ranging from about 200 W/mK to about 400 W/mK and an electrical conductivity of at least about 1E7 siemens per meter (S/m), for example, ranging from about 1E7 S/m to about 6E7 S/m, depending on the material.

In an implementation, the cladding 200 can alter both the thermal performance and the electrical operation of the geometrically complex-shaped susceptor 102 compared to a susceptor without cladding 200.

With regard to thermal performance, the cladding 200 can function as a passive heat exchanger to dissipate thermal energy from the overheated regions 110 that tend to reach thermal equilibrium at a temperature above the leveling temperature to the underheated regions 114 that tend to reach thermal equilibrium at a temperature of less than 10° F. below the leveling temperature. In this capacity, the cladding 200 provides passive regulation of the temperature across the surface of the susceptor 102, both on an exterior surface 204 and an interior surface 206 of the susceptor 102. This decreases the range of temperature across the surface of the susceptor 102 and allows for more precise thermal control of heating of the flowable material 106 within the receptacle 104.

With regard to electrical operation, the cladding 200 can provide a current path after one or more regions or portions of the susceptor 102 become low permeability and non-magnetic after reaching the Curie temperature. As described above, at relatively low temperatures the susceptor 102 is highly permeable to an electromagnetic flux field and the skin depth is small. At these relatively low temperatures, the electrical resistance of the susceptor 102 is high. When placed into an electromagnetic flux field generated from the induction coil 108, the susceptor 102 begins to inductively heat, the skin depth of the susceptor 102 increases and the magnetic permeability decreases, thereby attenuating the electrical resistance of the susceptor 102 and reducing the heating effect. The susceptor 102 becomes increasingly nonmagnetic, at which point the electric current begins to flow through the cladding 200 rather than the susceptor 102. Once the susceptor 102 begins to cool, the skin depth decreases, the magnetic permeability increases, and the electric current from the induction coil begins to flow through the susceptor 102, and the susceptor 102 begins to heat until reaching the leveling temperature. However, as described above, with a geometrically complex-shaped susceptor 102 absent cladding 200, current continues to flow through the susceptor and the susceptor can continue to heat well above the Curie temperature. By including the cladding 200, as portions of the susceptor 102 reach the Curie temperature and the susceptor 102 becomes magnetically low-permeable to non-permeable, the current resulting from the magnetic field generated by the inductor begins to flow through the cladding 200, thereby preventing overheating of the susceptor 102 above its designed Curie temperature.

Figure 3:
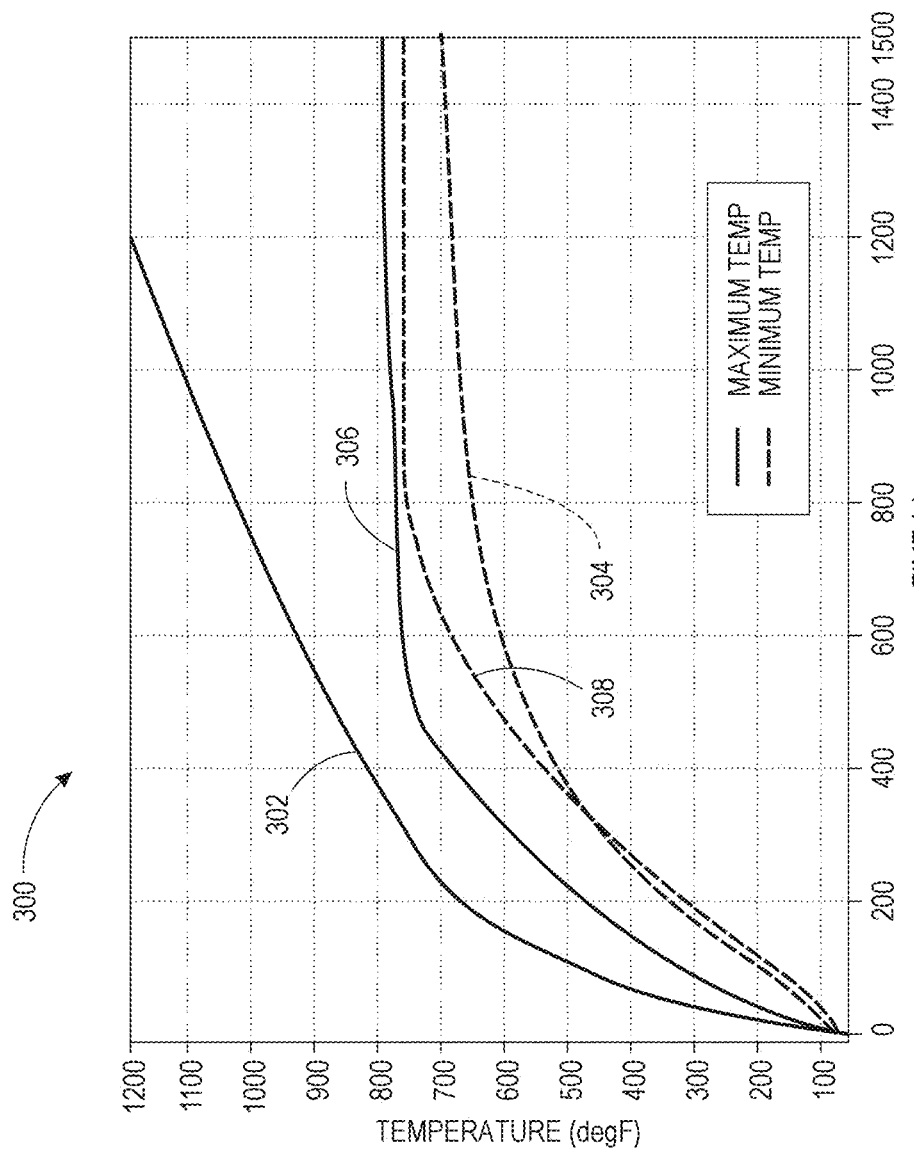
FIG. 3 is a graph comparing temperature profiles of a geometrically complex-shaped susceptor with and without cladding.

FIG. 3 is a graph 300 comparing profiles for temperatures (° F.) over time (seconds) for a geometrically complex-shaped susceptor with and without cladding 200. Line 302 depicts a maximum temperature, and line 304 depicts a minimum temperature, measured across the surface of a geometrically complex-shaped susceptor without cladding 200. Line 306 depicts a maximum temperature, and line 308 depicts a minimum temperature, measure across the surface of the geometrically complex-shaped susceptor with cladding 200. Without the cladding 200, temperatures at points across a surface of the susceptor 102 can vary by 400° F. or more and the maximum temperature continued to increase after 1200 seconds, thereby indicating a runaway maximum temperature significantly above the designed leveling temperature of 788° F. With the cladding 200, the temperature range decrease to less than 50° F. and the maximum temperature stabilized near the designed leveling temperature of 788° C. after about 1000 seconds.

In an implementation, the cladding 200 can have a thickness of about 0.53 millimeters (mm) to about 9.525 mm, or about 1.5875 mm to about 3.175 mm. A cladding 200 that is excessively thin results in an insufficient heating effect and high resistance to current flow, while a cladding 200 that is excessively thick adds weight and expense.

The cladding 200 can be formed on the exterior surface 204 of the susceptor 102 as depicted in FIG. 2, or the cladding 200 can be formed on the interior surface 206 of the susceptor 102 (not depicted for simplicity). In an implementation, the cladding 200 can cover about 25% to about 100% of the exterior or interior surface of the susceptor 102. Forming the cladding 200 over an excessively small percentage of the surface of the susceptor 102 results in an insufficient effect on thermal performance, in part by reducing the electric current path as the susceptor 102 approaches the leveling temperature. Forming cladding 200 over 100% of the exterior or interior surface forms a maximum current path as the susceptor 102 approaches the leveling temperature, thereby efficiently reducing the temperature range across the surface of the susceptor 102. For the described implementation, this effect reduces overheating and underheating at different points within the flowable material 106.

The cladding 200 can be formed on or over the susceptor 102 using any suitable process. For example, the cladding 200 can be spray coated onto the susceptor 102, for example, by suspending particles of the cladding 200 material within a solvent to form a cladding solution, spray coating the solution onto the susceptor 102, and removing the solvent from the solution using, for example, a drying process. The spray coating process may include the use of an optional mask to define one or more areas on the surface of the susceptor 102 where the cladding 200 will be formed. In another formation process, the cladding 200 can be preformed into a desired shape that matches contours of the susceptor 102 and the subsequently physically attached to the susceptor 102 using, for example, an electrically and thermally conductive adhesive. In another implementation, the cladding 200 can be brazed onto the surface of the susceptor 102. In yet another implementation, the cladding 200 can be electrodeposited onto the surface of the susceptor 102.

Where the cladding 200 does not cover 100% of the surface of the susceptor 102, the location of the cladding 200 can vary, for example, depending on the shape of the article to which it is being attached and other design considerations. The location of the cladding 200 may be determined through modeling (e.g., computer simulation) or other techniques, where the cladding 200 extends over the susceptor 102 on, and in proximity to, the overheated regions 110, thereby providing a preferred electric current path once the overheated regions 110 approach the leveling temperature. In another implementation, overheated regions 110 may be discovered during use or characterization of the smart susceptor, at which point the cladding 200 may be added to the surface of the susceptor 102 to mitigate localized overheating.

As discussed above relative to FIGS. 1 and 2, the induction coils 108 can be placed adjacent to all six sides of the susceptor 102 to provide inductive heating on six sides of the susceptor 102 in an attempt to ensure even heating of the flowable material 106 within the receptacle 104. As depicted, at least a portion of the induction coils 108 are formed to include longitudinal contours or curves that reflect the contours of the susceptor 102 to reduce a gap, and to maintain close proximity, between the induction coils 108 and the susceptor 102, particularly with the receptacle 104. Forming the induction coils 108 with longitudinal curves increases expense and generally devotes the induction coils 108 to their specific designed use.

Figure 4:
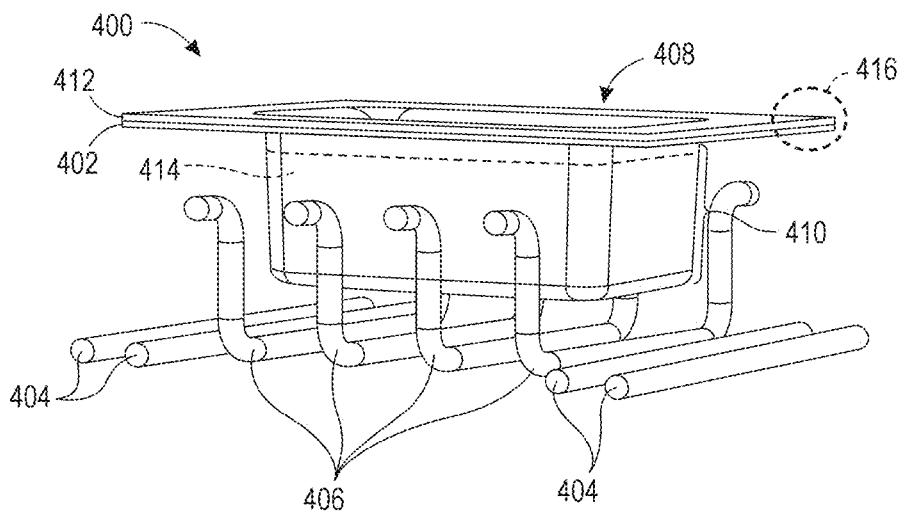
FIG. 4 is a perspective depiction of a smart susceptor that includes cladding over an exterior surface of a susceptor.

A smart susceptor design that includes cladding has a reduced sensitivity to the specific placement of the induction coil as well as to variations of electric current through the induction coils. This allows for a simplified design of the induction coils, thereby reducing production costs. In some designs, as depicted in FIG. 4, the cladding 402 can improve the thermal performance of the smart susceptor 400 such that both straight or linear induction coils 404 and longitudinally curved induction coils 406 can be used to provide even heating of a volume 408 of the receptacle 410 defined by the susceptor 412, and a material 414 such as a flowable material therewithin. In the depicted implementation, the cladding 402 covers 100% of an exterior surface of the susceptor 412 (although a lesser cladding coverage is contemplated) and, during use, the lower portions of each induction coil 404, 406 are coplanar. This can provide for reduced design complexity and manufacturing constraints, for example, by allowing each induction coil 404, 406 to be attached to a single planar surface (not depicted for simplicity). Further, the use of linear coils 404 may result in a more uniform magnetic field which can decrease the time required to bring the smart susceptor to the leveling temperature, thereby decreasing production costs and increasing manufacturing yields. For purposes of this disclosure a "straight" or "linear" induction coil is one in which any portion of the induction coil that has a magnetic field influence on any portion of the susceptor during operation of the smart susceptor assembly is straight or linear.

Figure 5:
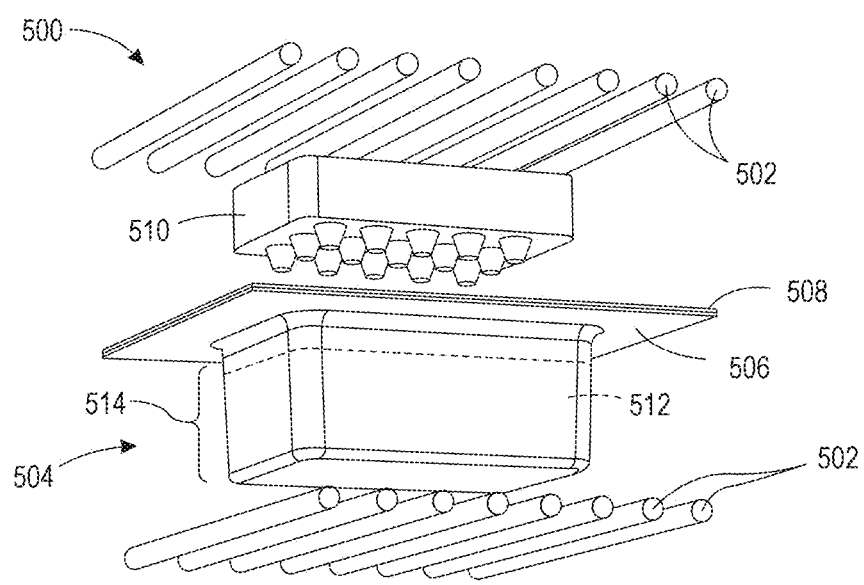
FIG. 5 is an exploded perspective depiction of another implementation of a smart susceptor that includes longitudinally linear induction coils.

FIG. 5 depicts an implementation of a smart susceptor 500 that includes only linear sections of one or more induction coils 502. The smart susceptor 500 further includes a lower pan or lower assembly 504 that includes a susceptor 506 and a cladding 508 that overlies 100% of an interior surface of the susceptor 506. FIG. 5 further depicts an upper pan or upper assembly 510 such as a mold that is used to shape a material 512 such as a flowable material within a receptacle 514 formed by the susceptor 506 and the cladding 508. The upper assembly 510 and the lower assembly 504, including the susceptor 506, are positioned directly between two or more longitudinally linear sections of the one or more induction coils 502.

FIG. 5 depicts linear induction coils 502 overlying and underlying the susceptor 506. Because the cladding 508 improves the thermal performance of the smart susceptor 500, the spacing constraints of the induction coils 502 relative to the susceptor 506 can be relaxed while maintaining even heating of the flowable material 512, for example, in contrast a smart susceptor without cladding 200. Further, a much higher current can be applied to the induction coils 502 to bring the susceptor 506 to the leveling temperature much more quickly, heating the flowable material 512 much more quickly, reducing manufacturing time and costs, and increasing production yields compared to a smart susceptor without cladding. In one implementation, an initial current, for example 1600 amps (A), can be applied to the induction coils 502 until a temperature measured at one or more points on the susceptor 506 reaches a predetermined threshold, for example 750° F., at which point the current may be reduced to 600 A. Reducing the current from the initial current to the reduced current assists in maintaining the leveling temperature at some susceptor locations while continuing to heat other locations that are below the leveling temperature.

Figure 6:
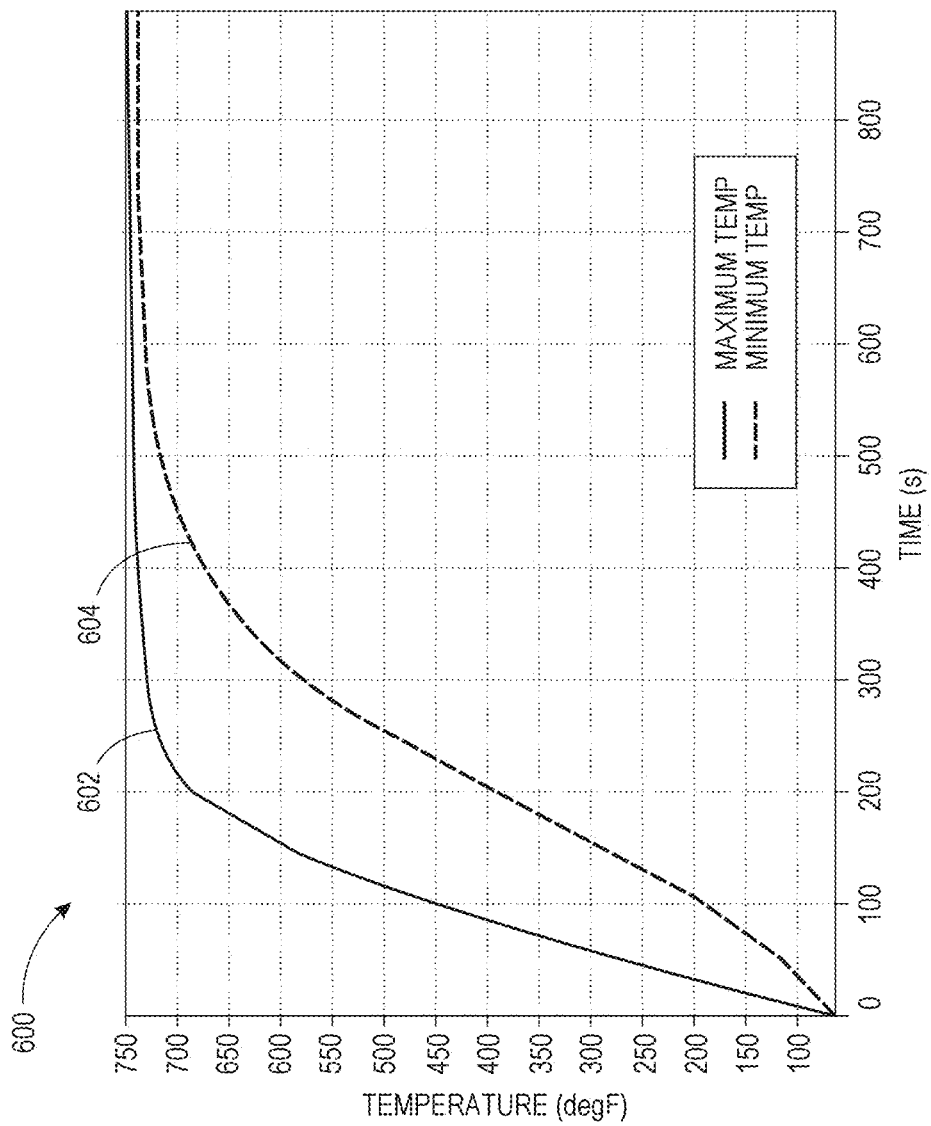
FIG. 6 is a graph showing maximum and minimum temperatures on a susceptor surface over a period of time.

Modeling of structures similar to those of depicted in FIGS. 4 and 5 produced similar temperature profiles. The graph 600 of FIG. 6 shows a maximum temperature 602 and a minimum temperature 604 measured within the volume of the receptacle 410 (FIG. 4). Omitting the temperatures at the outermost portions of the edges (e.g., corners 416, FIG. 4) that have little to no effect on the temperature of the volume of the receptacle 410, the range of minimum and maximum temperatures across the susceptor 412 upon reaching thermal equilibrium after about 700 seconds is 5° F.

Figure 7:
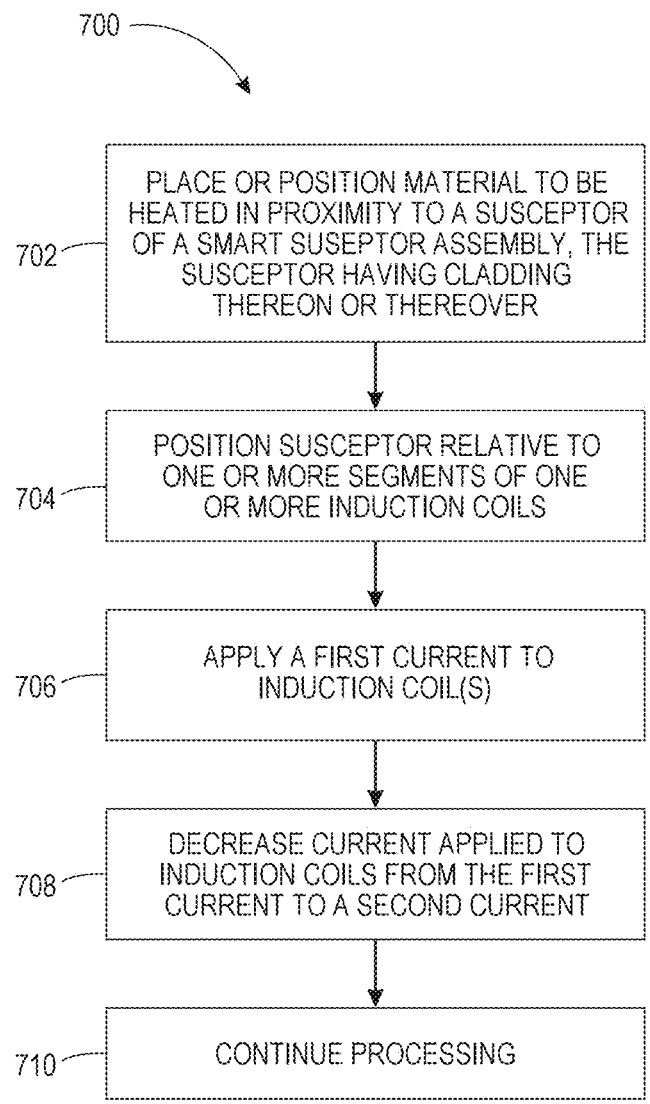
FIG. 7 depicts a flow chart or flow diagram for a process or method for heating an article using a smart susceptor in accordance with the present teachings.

A smart susceptor including cladding in accordance with the present teachings can be used in various ways depending on the specific application. A process or method 700 for heating an article using a smart susceptor is depicted in the flow chart or flow diagram of FIG. 7. The method 700 can proceed by operation or use of one or more of the structures depicted in the figures described above, and thus is described with reference to FIGS. 4 and 5; however, it will be appreciated that the method 700 is not limited to any particular structure or use unless expressly stated herein. It will be appreciated that while the method 700 is described as a series of acts or events, the present teachings are not limited by the ordering of such acts or events. Some acts can occur in different orders and/or concurrently with other acts or events apart from those described herein. Further, a method in accordance with the present teachings can include other acts or events that have not been depicted for simplicity, while other illustrated acts or events can be removed or modified.

In one implementation, as at 702, a material to be heated, for example, a flowable material 414, 512 such as a thermoset, thermoplastic, or mold material is placed in proximity to a susceptor 412, 506 that is part of a smart susceptor assembly 400, 500. The susceptor 412, 506 may have a geometrically complex shape, for example, with a plurality of contours that form a receptacle 410, 514, where the flowable material is placed into the receptacle 410, 514. The smart susceptor assembly 400, 500 further includes a cladding layer (cladding) 402, 508 on or over an exterior and/or interior surface of the susceptor 412, 506. The susceptor 412, 506 is positioned relative to one or more segments of one or more induction coils 404, 406, 502, as shown at 704. The induction coils 404, 406, 502 can include straight or linear induction coils 404, 502, longitudinally curved induction coils 406, or a combination of both.

Subsequently, as shown at 706, a current is applied to the induction coils 404, 406, 502. The current results in the induction coils 404, 406, 502 emitting a magnetic flux field onto the susceptor 412, 506 which results in resistive heating of the susceptor 412, 506, which begins to heat the flowable material 414, 512 within the receptacle 410, 514 of the susceptor 412, 506. In an implementation, a relatively high current of about 1500 A to about 1700 A, for example about 1600 A, can be applied to the induction coils 404, 406, 502 to quickly bring the susceptor 412, 506 to the leveling temperature for which it was designed, thereby heating the flowable material 414, 512 to a target temperature. For purposes of explanation, the target temperature is 788° F. and the smart susceptor 400, 500 is designed for a leveling temperature of 788° F. or higher that is sufficient to heat the flowable material 414, 512 to the target temperature. At relatively low temperatures, the susceptor 412, 506 is highly permeable to the electromagnetic flux field and the skin depth of the susceptor 412, 506 is small. As the susceptor 412, 506 heats and approaches the leveling temperature, the magnetic permeability of the susceptor 412, 506 decreases, the current flow through the susceptor 412, 506 decreases, and the current flow through the cladding 402, 508 increases. Once a portion of the susceptor reaches the Curie temperature, that portion of the susceptor generally becomes magnetically low-permeable to non-permeable and non-magnetic, and current flow is transferred to the cladding.

During heating of the susceptor 412, 506, a temperature at one or more susceptor locations can be monitored. As the susceptor 412, 506 approaches the leveling temperature at the one or more monitored locations, the current applied to the induction coils 404, 406, 502 can be ramped downward or otherwise decreased as at 708 to maintain the susceptor 412, 506 at the leveling temperature using the reduced current. In an implementation, the current applied to the induction coils 404, 406, 502 can be reduced to about 500 A to about 700 A, for example to about 600 A. The initial relatively high current of 1500 A to 1700 A thus rapidly heats the susceptor 412, 506 to its designed leveling temperature, thereby rapidly bringing the flowable material 414, 512 to the target temperature, while the reduced current of between about 500 A and 700 A maintains the susceptor 412, 506 at leveling temperature and the flowable material 414, 512 at the target temperature.

Once the flowable material 414, 512 reaches the target temperature, the molding process of the flowable material 414, 512 can be performed. This molding process can including inserting the upper assembly 510 into the heated flowable material 414, 512 within the receptacle 410, 514. The molding process can then continue according to known techniques, as at 710.

Thus a smart susceptor assembly according to an implementation of the present teachings can include a susceptor having a geometrically complex shape. In such a configuration, the susceptor typically can have overheated regions that exceed the leveling temperature and can result in thermal runaway. Simultaneously, the susceptor typically can have underheated regions that are more than 10° F. under the leveling temperature. By adding cladding that can include one or more discrete cladding structures to one or more surfaces of the susceptor, the electrical operation of the smart susceptor and the thermal profile of the susceptor during use is altered. In one aspect, the range of temperatures across the surface of the susceptor upon reaching thermal equilibrium is decreased to a mean temperature that approaches the leveling temperature for which the smart susceptor is designed.

Additional Embodiments

As described above, the Curie temperature is governed by the chemical composition of the smart susceptor, and the leveling temperature is typically a few degrees below the smart susceptor's Curie temperature. A smart susceptor is usually selected to match its leveling temperature to the temperature requirements of the manufacturing process. However, when these temperature requirements do not match the leveling temperature of readily available smart susceptor alloys or materials, a new smart susceptor alloys must be designed and manufactured. In many cases, developing new smart susceptor alloys to match a required leveling temperature is costly and impractical. Accordingly, there is a desire for methods of adjusting the leveling temperature of existing smart susceptor, and for smart susceptors with adjustable leveling temperatures.

According to some implementations of the present teachings, the inventors have surprisingly discovered that an electrically conductive skin or cladding may be used to adjust the leveling temperature of a smart susceptor. In some implementations, the cladding may increase the average leveling temperature of the smart susceptor. In other implementations, the cladding may increase one or more localized leveling temperatures of the smart susceptor.

Figure 8:
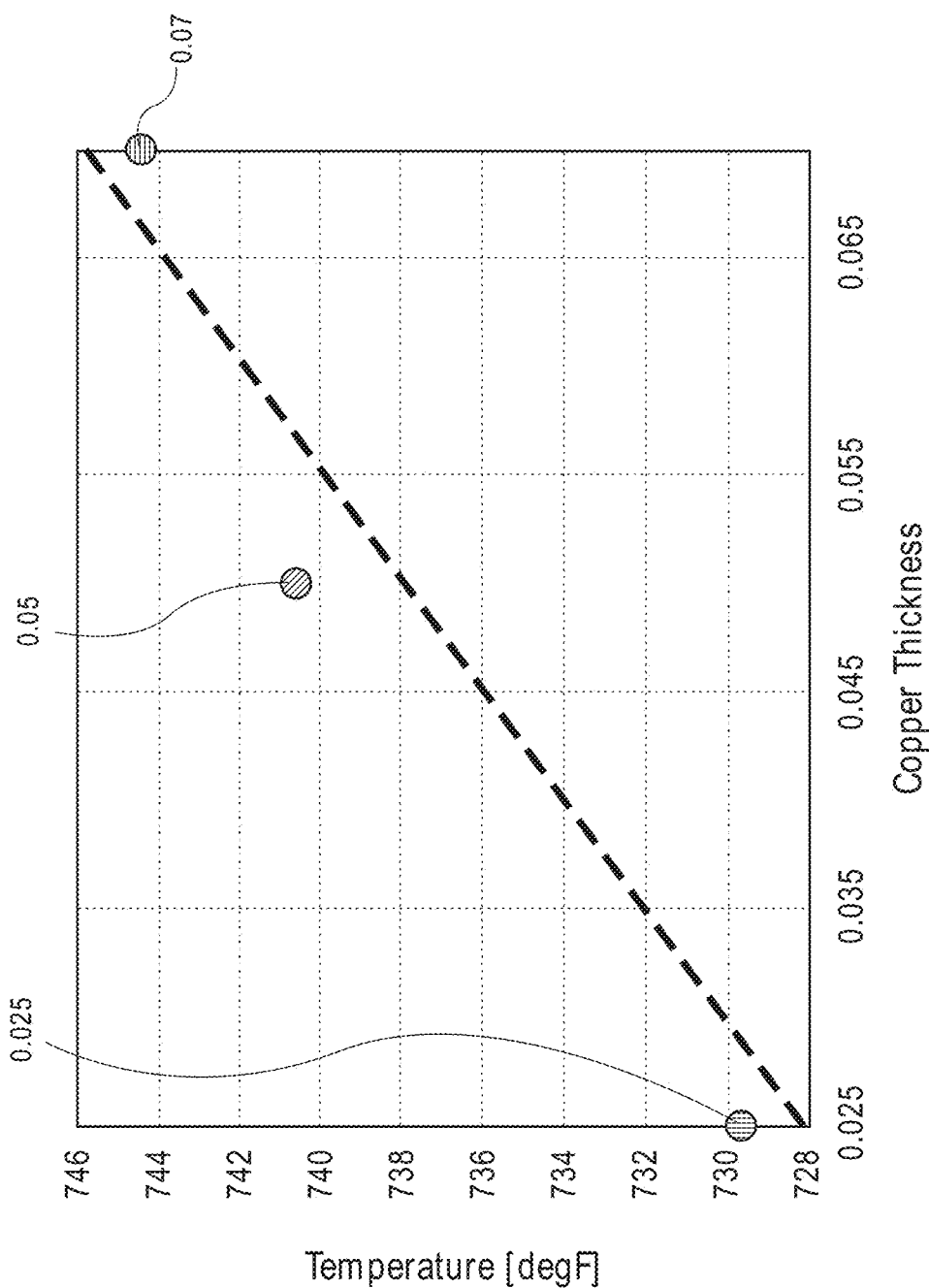
FIG. 8 illustrates experimental temperature data for a smart susceptor assembly in accordance with the present teachings.

FIG. 8 illustrates experimental temperature data for a smart susceptor assembly in accordance with the present teachings.

In particular, a 1 inch×1 inch smart susceptor (0.050 inches thick) was thermally sprayed with copper to form a smart susceptor assembly and the leveling temperature for the smart susceptor was then measured as follows: A thermocouple was placed at the center of the coated smart susceptor sample, and the smart susceptor was then placed in a small tester coil generating a magnetizing field. The tester coil was a solenoid test coil excited with a 10 kHz AC signal. The voltage was adjusted to obtain approximately 30 Amps through the test coil which produced a peak applied field of approximately 260 Oersteds.

As illustrated in FIG. 8, an average leveling temperature of the smart susceptor increased according to the thickness of the cladding. In particular, the average leveling temperature of the smart susceptor increased from 729° F. when cladded with 0.025 inches of copper, to 744° F. when cladded with 0.070 inches of copper.

In some implementations, a smart susceptor assembly may have a first leveling temperature corresponding to a same but uncladded smart susceptor, or portion thereof, and a second leveling temperature corresponding to a cladded smart susceptor, or cladded portion thereof, wherein the first leveling temperature is different from the second leveling temperature. For example, the second leveling temperature may be higher than the first leveling temperature. While not bound to any particular theory, the inventors believe that, in some embodiments, as the cladding thickness increases (or is present) more current flows in the cladding for a same amount of convective heat loss from the corresponding (cladded or uncladded) surface, resulting in a net increase in temperature.

Figure 9:
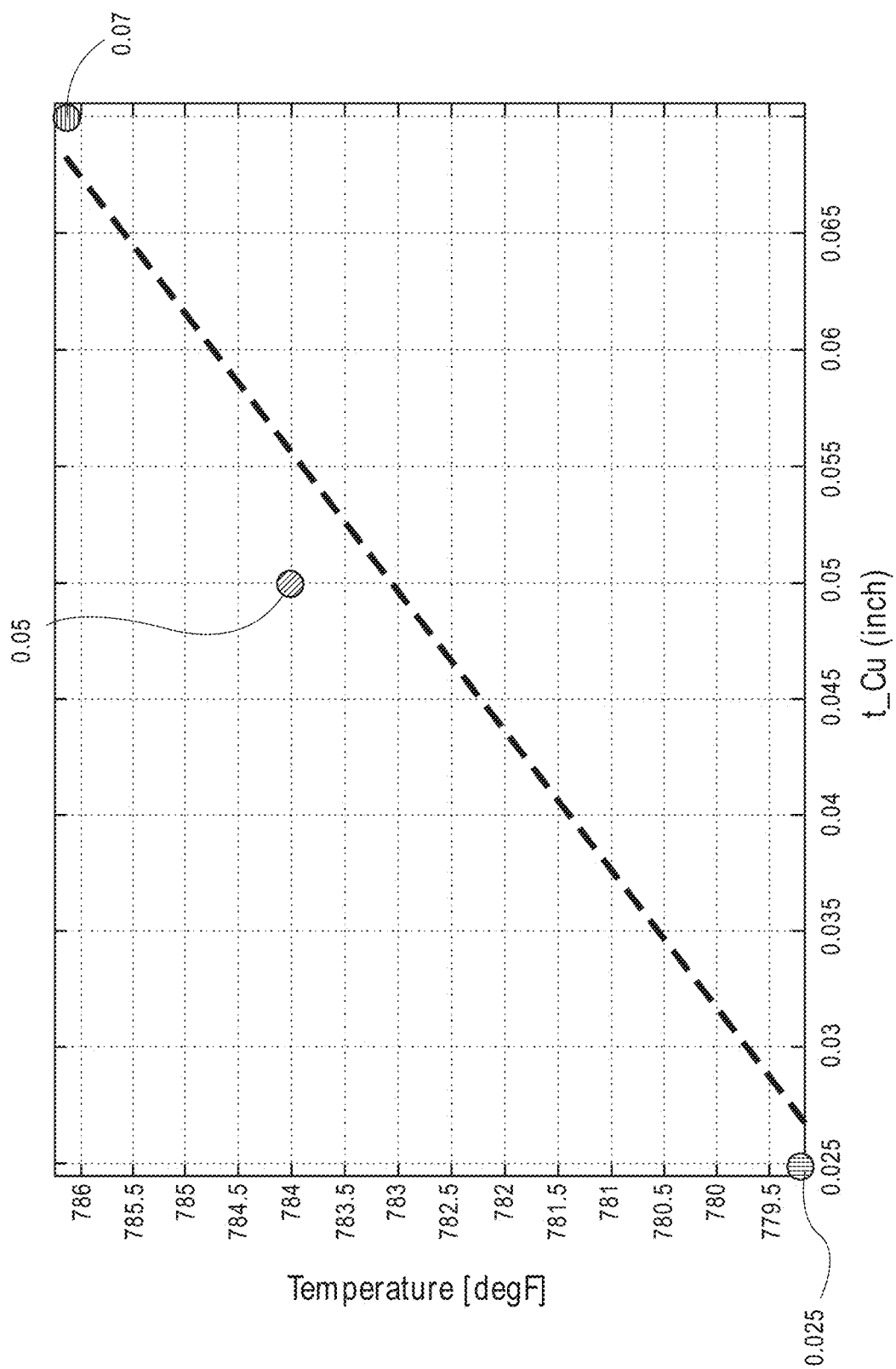
FIG. 9 illustrates modeled temperature data for a smart susceptor assembly in accordance with the present teachings.

FIG. 9 illustrates modeled temperature data for a smart susceptor assembly in accordance with the present teachings. The model illustrated in FIG. 9 assumes the same geometric/composition details as the sample used for the experimental results illustrated in FIG. 8.

As illustrated in the mathematical model of FIG. 9, the average leveling temperature of the smart susceptor also increases with an increase in the cladding thickness. The small differences in the temperatures modeled (FIG. 9) versus the temperatures measured in FIG. 8 are a result of various assumptions made in the mathematical model and the exclusion of radiation effects. However, a similar trend is clearly observed of a raising leveling temperature corresponding to an increase in the cladding thickness.

In other implementations, the leveling temperature of the smart susceptor may also be increased by the material composition of the cladding instead of or in addition to the thickness of the cladding. For example, a copper cladding may increase the leveling temperature of a smart susceptor to a higher temperature than a different metallic cladding applied to the same thickness.

While not intending to be bound to any particular theory, the inventors believe that the electrical conductivity of the cladding material may control the leveling temperature increase. That is, if applied at the same thickness, cladding materials with a higher electrical conductivity will increase the leveling temperature higher.

Figure 10:
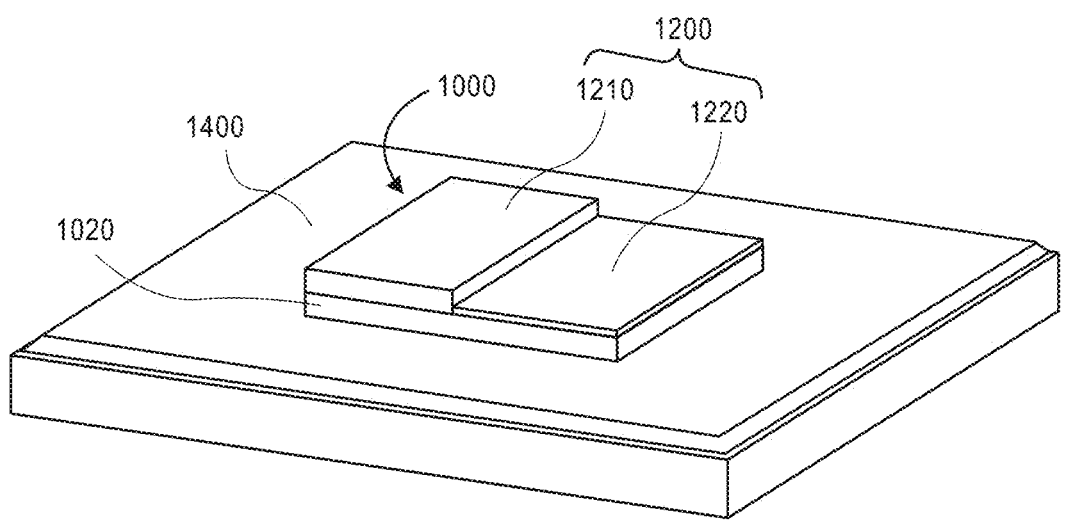
FIG. 10 depicts a smart susceptor assembly in accordance with the present teachings.
Figure 11:
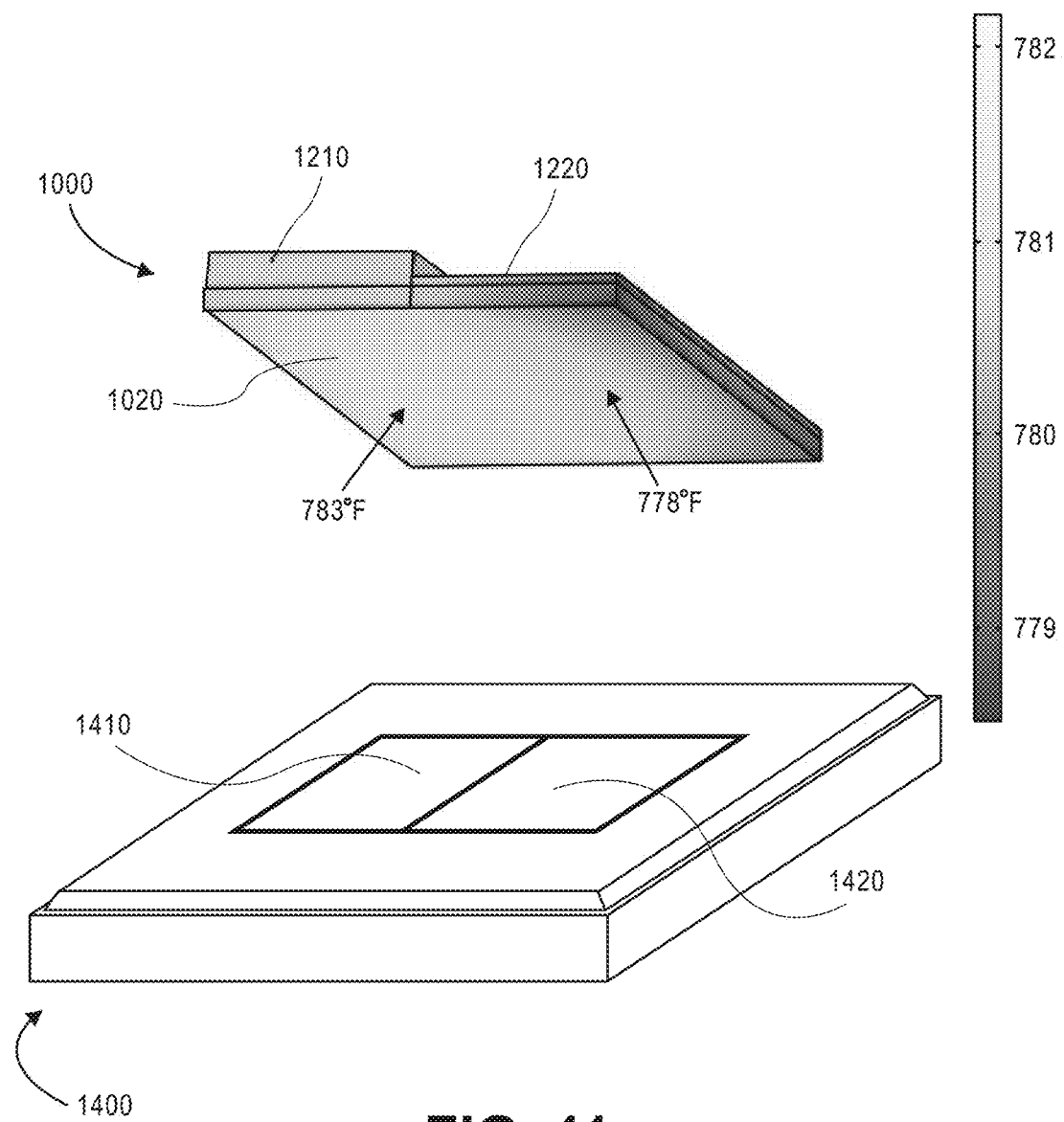
FIG. 11 depicts a smart susceptor assembly in accordance with the present teachings.

FIGS. 10-11 depict a smart susceptor assembly in accordance with the present teachings. As illustrated in FIGS. 10-11, a smart susceptor assembly may include a smart susceptor 1020, and a cladding 1200 disposed on at least a portion of the smart susceptor 1020. The smart susceptor 1020 may be placed over a substrate 1400 and may be configured to heat the substrate 1400 upon application of a magnetic field as described above.

The smart susceptor 1020 may include one or more of an iron alloy, a nickel alloy, a cobalt alloy, a ferrous nickel-cobalt alloy. The smart susceptor 1020 may also include other suitable smart susceptor materials, such as amorphous or crystalline magnetic alloys.

The cladding 1200 may include an electrically conductive material, such as copper, silver, gold, platinum, bronze, and non-magnetic copper-nickel alloys. In certain implementations, the cladding 1200 includes materials with a lower magnetic permeability than the susceptor 1020. In other implementations, the cladding 1200 includes materials with a higher thermal conductivity and/or a high electrical conductivity than the smart susceptor 1020.

According to some implementations of the present teachings, the cladding 1200 may physically contact the smart susceptor 1020, and the cladding 1200 may have a thickness from about 0.53 millimeters (mm) to about 9.525 mm. In some implementations, the cladding 1200 covers 25% or more of a surface of the smart susceptor 1020. In other implementations, the cladding 1200 covers substantially all of an exterior surface of the smart susceptor 1020. In other implementations, the cladding 1200 may have a thickness from about 25% to about 200% of the thickness of the smart susceptor 1020.

According to some implementations, the leveling temperature of the smart susceptor 1020 is higher in the portions covered by the cladding 1200. In other implementations, the cladded smart susceptor 1020 has a higher leveling temperature when compared to a same but uncladded smart susceptor 1020. The leveling temperature of a cladded smart susceptor 1020 may be higher than the Curie temperature for the smart susceptor 1020. For example, the leveling temperature of the cladded smart susceptor 1020 may be at least 5° F. higher, at least 10° F. higher, at least 15° F. higher, at least 20° F. higher, at least 25° F. higher, or at least 30° F. higher when compared to a same but uncladded smart susceptor 1020.

In other implementations, the smart susceptor assembly has a first leveling temperature corresponding to the uncladded portions of the smart susceptor, and a second leveling temperature corresponding to the cladded portions of the smart susceptor, wherein the first leveling temperature is different from the second leveling temperature. For example, the second leveling temperature may be higher than the first leveling temperature, the second leveling temperature may be higher than a Curie temperature of the smart susceptor, or the second leveling temperature may be at least 5° F. higher, at least 10° F. higher, at least 15° F. higher, at least 20° F. higher, at least 25° F. higher, or at least 30° F. higher than the first leveling temperature.

In some implementations, the cladding 1200 may include a first cladding portion 1210 and a second cladding portion 1220, and a leveling temperature of the smart susceptor 1020 corresponding to the first cladding portion 1210 may be different from a leveling temperature of the smart susceptor 1020 corresponding to the second cladding portion 1220.

For example, as illustrated in FIG. 11, in some implementations, the substrate 1400 may have substrate portions 1410 and 1420 that need to be heated to different temperatures. Accordingly, the smart susceptor 1020 may include cladding portions 1210 and 1220 configured to create localized areas in the smart susceptor with different leveling temperatures. For example, as illustrated in FIGS. 10-11, a portion of the smart susceptor 1020 corresponding to the cladding portion 1210 is disposed over the substrate portion 1410 and has a leveling temperature of 783° F., whereas a portion of the smart susceptor 1020 corresponding to the cladding portion 1220 is disposed over the substrate portion 1420 and has a leveling temperature of 778° F.

Accordingly, in some implementations the smart susceptor 1020 may have a first leveling temperature corresponding to the first cladding portion 1210 and a second leveling temperature corresponding to the second cladding portion 1220. In some implementations, the first leveling temperature is at least 5° F. higher, at least 10° F. higher, at least 15° F. higher, at least 20° F. higher, at least 25° F. higher, or at least 30° F. higher than the second leveling temperature.

In some implementations, the first cladding portion 1210 may have at least one of a different magnetic permeability than the second cladding portion 1220, a different thermal conductivity than the second cladding portion 1220, a different electrical conductivity than the second cladding portion 1220, and combinations thereof.

For example, the first cladding portion 1210 may include a first cladding material and the second cladding portion 1220 may include a second cladding material, and the first cladding material may be different from the second cladding material. In addition, the first cladding material may have one or more of a different magnetic permeability, a different thermal conductivity, and a different electrical conductivity from the second cladding material.

In another example, the first cladding portion 1210 may have a first cladding thickness and the second cladding portion 1220 may have a second cladding thickness, the first cladding thickness being different from the second cladding thickness, and the first cladding portion 1210 may have one or more of a different magnetic permeability, a different thermal conductivity, and a different electrical conductivity from the second cladding portion 1220.

In some implementations, the cladding 1200 includes one or more cladding portions (1210 and 1220) having at least one of a different composition and thickness, and the smart susceptor 1020 has one or more leveling temperatures corresponding to the one or more cladding portions (1210 and 1220). For example, a leveling temperature of the uncladded portions of the smart susceptor may be different from at least one of the leveling temperature of the smart susceptor corresponding to the first cladding portion and the leveling temperature of the smart susceptor corresponding to the second cladding portion.

The leveling temperature of a smart susceptor in accordance with the present teachings may be adjusted in various ways. For example, a method for adjusting the leveling temperature of a smart susceptor 1020 may include cladding at least a portion of a smart susceptor 1020 with an electrically conductive material or cladding 1200, and adjusting the cladding 1200 to adjust a leveling temperature of the smart susceptor 1020.

Adjusting the cladding 1200 may include adjusting the thickness of the cladding 1200 to adjust the leveling temperature of the smart susceptor 1020, or may also include adjusting the thickness of a portion of cladding 1200 to adjust the leveling temperature of the corresponding portion of the smart susceptor 1020.

Adjusting the cladding 1200 may also include adjusting the composition of the cladding 1200 to adjust the leveling temperature of the smart susceptor 1020, or may also include adjusting the composition of a portion of the cladding 1200 to adjust the leveling temperature of the corresponding portion of the smart susceptor 1020.

Adjusting the leveling temperature of the smart susceptor 1020 may also include adjusting the leveling temperature of the smart susceptor 1020 corresponding to cladded portions (1210 and 1220) of the cladding 1200, by adjusting at least one of the thickness and composition of the cladding portions (1210 and 1220).

In some implementations, the smart susceptor 1020 is adjusted to have 2 or more leveling temperatures. In other implementations, the smart susceptor 1020 is adjusted to have portions of the smart susceptor with different leveling temperatures corresponding to cladded portions (1210 and 1220) of the cladding 1200 having at least one of a different thickness and composition.

Adjusting the leveling temperature of the smart susceptor 1020 may include adjusting the smart susceptor to have a leveling temperature at least 5° F. higher, at least 10° F. higher, at least 15° F. higher, at least 20° F. higher, at least 25° F. higher, or at least 30° F. higher than a same but uncladded smart susceptor.

Adjusting the leveling temperature of the smart susceptor 1020 may include adjusting the smart susceptor to have a first leveling temperature (corresponding to a first cladding portion) at least 5° F. higher, at least 10° F. higher, at least 15° F. higher, at least 20° F. higher, at least 25° F. higher, or at least 30° F. higher than a second leveling temperature (corresponding to a second cladding portion or uncladded portion).

In one implementations, a method of using the smart susceptor assembly to heat a material includes disposing a material in proximity to a smart susceptor 1020, for example by placing the smart susceptor 1020 in contact with a substrate 1400, and exposing the smart susceptor 1020 to an electromagnetic flux field to heat the smart susceptor 1020.

It will be appreciated that the article to be heated may include any solid, liquid, or gaseous material, or any combination of two or more of a solid, a liquid, or a gas, including fiber/fabric layers such as carbon fiber layers pre-impregnated with a thermally curable resin. The smart susceptor assembly may be used to heat one or more materials during any number of manufacturing, testing, production, etc., processes related to various fields of endeavor such as vehicle manufacture or testing (e.g., aerospace vehicles, military vehicles, transportation vehicles, etc.), manufacture and testing of consumer products, etc.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A smart susceptor assembly, comprising:
    a smart susceptor comprising one smart susceptor material and having two or more leveling temperatures, and
    a cladding disposed on at least a portion of the smart susceptor,
    wherein the smart susceptor material is one of an iron alloy, a nickel alloy, a cobalt alloy, a ferrous nickel-cobalt alloy, and amorphous, a crystalline magnetic alloy, or combinations thereof,
    wherein the cladding comprises an electrically conductive material, and
    wherein the cladding comprises a first cladding portion and a second cladding portion, and wherein a leveling temperature of the smart susceptor corresponding to the first cladding portion is different from a leveling temperature of the smart susceptor corresponding to the second cladding portion.

2. The smart susceptor assembly of claim 1, wherein the cladding physically contacts the smart susceptor, and
    wherein the cladding has a thickness of about 0.53 millimeters (mm) to about 9.525 mm.

3. The smart susceptor assembly of claim 1, wherein the cladding comprises at least one of copper, silver, gold, platinum, bronze, non-magnetic copper-nickel alloys, or combinations thereof.

4. The smart susceptor assembly of claim 1, wherein the cladding has at least one of:
   a lower magnetic permeability than the smart susceptor,
   a higher thermal conductivity than the smart susceptor, and
   a higher electrical conductivity than the smart susceptor.

5. The smart susceptor assembly of claim 1, wherein at least one of the two or more leveling temperatures of the smart susceptor is higher in the cladded portions.

6. The smart susceptor assembly of claim 1, wherein at least one of the two or more leveling temperatures of the smart susceptor is higher than a Curie temperature for the smart susceptor material.

7. The smart susceptor assembly of claim 1, wherein at least one of the two or more leveling temperatures of the smart susceptor corresponding to the cladded portions is at least 5° F. higher than a leveling temperature corresponding to uncladded portions of the smart susceptor.

8. The smart susceptor assembly of claim 1, wherein the smart susceptor has a leveling temperature corresponding to uncladded portions of the smart susceptor, and two or more leveling temperatures corresponding to the cladded portions of the smart susceptor.

9. The smart susceptor assembly of claim 8, wherein the two or more leveling temperatures corresponding to the cladded portions of the smart susceptor are higher than the leveling temperature corresponding to uncladded portions of the smart susceptor.

10. The smart susceptor assembly of claim 8, wherein the two or more leveling temperatures corresponding to the cladded portions of the smart susceptor are higher than a Curie temperature of the smart susceptor material.

11. The smart susceptor assembly of claim 8, wherein the two or more leveling temperatures corresponding to the cladded portions of the smart susceptor are at least 5° F. higher, at least 10° F. higher, at least 15° F. higher, at least 20° F. higher, at least 25° F. higher, or at least 30° F. higher than the leveling temperature corresponding to uncladded portions of the smart susceptor.

12. The smart susceptor assembly of claim 8, wherein a leveling temperature of an uncladded portion of the smart susceptor is different from the two or more leveling temperatures of the smart susceptor corresponding to the first cladding portion and the second cladding portion.

13. The smart susceptor assembly of claim 1, wherein the first cladding portion has at least one of:
   a different magnetic permeability than the second cladding portion,
   a different thermal conductivity than the second cladding portion,
   a different electrical conductivity than the second cladding portion, and
   combinations thereof.

14. The smart susceptor assembly of claim 13, wherein the leveling temperature of the smart susceptor corresponding to the first cladding portion is at least 5° F. higher, at least 10° F. higher, at least 15° F. higher, at least 20° F. higher, at least 25° F. higher, or at least 30° F. higher than the leveling temperature of the smart susceptor corresponding to the second cladding portion.

15. The smart susceptor assembly of claim 1, wherein the first cladding portion comprises a first cladding material and the second cladding portion comprises a second cladding material, and
   wherein the first cladding material is different from the second cladding material.

16. The smart susceptor assembly of claim 1, wherein the first cladding portion has a first cladding thickness and the second cladding portion has a second cladding thickness, and
   wherein the first cladding thickness is different from the second cladding thickness.

17. A smart susceptor assembly, comprising:
   a smart susceptor comprising one smart susceptor material having two or more leveling temperatures, and
   an electrically conductive cladding covering at least a portion of the one smart susceptor material,
   wherein the electrically conductive cladding has at least one of a lower magnetic permeability, a higher thermal conductivity, and a higher electrical conductivity than the one smart susceptor material, and
   wherein the electrically conductive cladding adjusts the leveling temperature of the one smart susceptor material on at least the portion of the one smart susceptor material covered by the electrically conductive cladding such that a leveling temperature corresponding to uncladded portions of the one smart susceptor material is different from a leveling temperatures corresponding to the cladded portions of the one smart susceptor material to define the two or more leveling temperatures.

18. The smart susceptor assembly of claim 17, wherein the cladding comprises a first cladding portion and a second cladding portion, and wherein a leveling temperature of the one smart susceptor material corresponding to the first cladding portion is different from a leveling temperature of the one smart susceptor material corresponding to the second cladding portion.

19. A method for adjusting a leveling temperature of a smart susceptor consisting of one smart susceptor material, comprising:
   cladding at least a portion of a smart susceptor with an electrically conductive material; and
   adjusting the cladding to adjust the leveling temperature of the smart susceptor on the at least a portion of the smart susceptor cladded with the electrically conductive material such that a leveling temperature corresponding to uncladded portions of the smart susceptor is different from a leveling temperature corresponding to the cladded portions of the smart susceptor material,
   wherein adjusting the cladding comprises at least one of:
   adjusting a thickness of the cladding,
   adjusting a thickness of a portion of the cladding to adjust the leveling temperature of a corresponding portion of the smart susceptor cladded by the electrically conductive material,
   adjusting a composition of the cladding, and
   adjusting a composition of a portion of the cladding to adjust the leveling temperature of a corresponding portion of the smart susceptor cladded by the electrically conductive material.

20. The method of claim 19, wherein the cladding comprises a first cladding portion and a second cladding portion, and wherein a leveling temperature of the smart susceptor corresponding to the first cladding portion is different from a leveling temperature of the smart susceptor corresponding to the second cladding portion.

* * * * *